United States Patent [19]

Anstey et al.

[11] Patent Number: 4,956,960
[45] Date of Patent: Sep. 18, 1990

[54] HOUSING FOR HOLDING A SUPPLY ROLL OF LARGE ROUND BALE WRAP MATERIAL

[75] Inventors: Henry D. Anstey, Ottumwa; George W. Rumph, Bloomfield, both of Iowa

[73] Assignee: Deere & Company, Moline, Ill.

[21] Appl. No.: 370,537

[22] Filed: Jun. 23, 1989

[51] Int. Cl.⁵ .................. B65B 11/30; B65B 13/22; B65B 27/12; B65H 19/00
[52] U.S. Cl. .................................... 53/118; 53/389; 53/587; 56/391; 100/5; 242/55.2; 242/55.53
[58] Field of Search .................. 53/118, 389, 587; 56/391; 100/5, 88; 242/55.2, 55.53

[56] References Cited

U.S. PATENT DOCUMENTS

| | | | |
|---|---|---|---|
| 2,243,686 | 5/1941 | Steiner et al. | 242/55.53 |
| 2,924,494 | 2/1960 | Sloier | 242/55.2 |
| 3,510,033 | 5/1970 | Schramm et al. | 242/55.2 |
| 4,502,621 | 3/1985 | Thatcher | 242/55.53 X |
| 4,597,241 | 7/1986 | Clostermeyer | 53/587 X |
| 4,691,503 | 9/1987 | Frerich. | |
| 4,697,402 | 10/1987 | Anstey et al. | 53/587 X |
| 4,787,193 | 11/1988 | Verhulst et al. | 53/389 X |

FOREIGN PATENT DOCUMENTS 2032449 1/1972 Fed. Rep. of Germany ..... 242/55.2

Primary Examiner—Robert L. Spruill
Assistant Examiner—Beth Bianca

[57] ABSTRACT

A mechanism for enveloping a large round bale with a surface wrap material such as plastic sheet or net includes a housing for holding a supply roll of the wrap material. The mechanism and, hence, the housing is mounted on the rear of a bale discharge gate. The housing includes a front wall, defined by an upright panel secured across the rear of the gate, and a bottom wall sloped upwardly and rearwardly relative to the front wall. The bottom wall and front wall converge toward a wrap material passage defined between a forward edge of the bottom wall and the front wall. The bottom wall is curved convexly upwardly between front and rear ends thereof, with the curvature and slope of the bottom wall being chosen such that a roll of wrap material resting on the bottom wall will become increasingly wedged against the front and bottom walls as the material is used and the weight and diameter of the roll decreases with the result that the braking force imposed on the roll will remain substantially constant no matter what the weight or size of the remaining roll.

9 Claims, 3 Drawing Sheets

HOUSING FOR HOLDING A SUPPLY ROLL OF LARGE ROUND BALE WRAP MATERIAL

BACKGROUND OF THE INVENTION

The present invention relates to a mechanism for enveloping large round bales, formed in a bale-forming chamber, with a wrap material such as plastic sheet or net and more particularly relates to a housing for holding a supply of such wrap material in a position for being fed into the bale-forming chamber.

U.S. Pat. No. 4,691,503, granted to Josef Frerich on Sept. 8, 1987, discloses a surface wrap housing structure, of the type described above, mounted on the rear of a round baler discharge gate and incorporating a pivotable arm having a portion disposed for engaging the periphery of a roll of wrap material located in the housing, the arm being biased against the roll by a spring so that it acts as a brake for preventing the roll from rotating, due to its momentum and in response to the action of the cut-off blade striking the wrap material, once sufficient wrap material has been pulled from the roll for wrapping a completed bale. While this structure operates satisfactorily to prevent unwanted unwrapping of wrap material, it has the drawback of involving several parts for accomplishing this simple task and, hence, adds undesired cost to the structure.

SUMMARY OF THE INVENTION

According to the present invention, there is provided an improved housing for holding a supply roll of surface wrap material for large round bales, and, more particularly, there is provided a housing incorporating a brake structure which represents an improvement over the brake structure disclosed in the above-mentioned patent.

An object of the invention is to provide a surface wrap housing incorporating a simply constructed braking structure.

A more specific object of the invention is to provide a surface wrap housing including a floor shaped to frictionally engage a supply roll of surface wrap material such that a substantially constant braking force is imposed on the roll as the diameter of the roll decreases as a result of the material being fed into the bale-forming chamber for wrapping bales formed therein.

These and other objects will become apparent from reading the ensuing description together with the appended drawings.

DESCRIPTION OF THE PREFERRED EMBODIMENT

Figure 1:
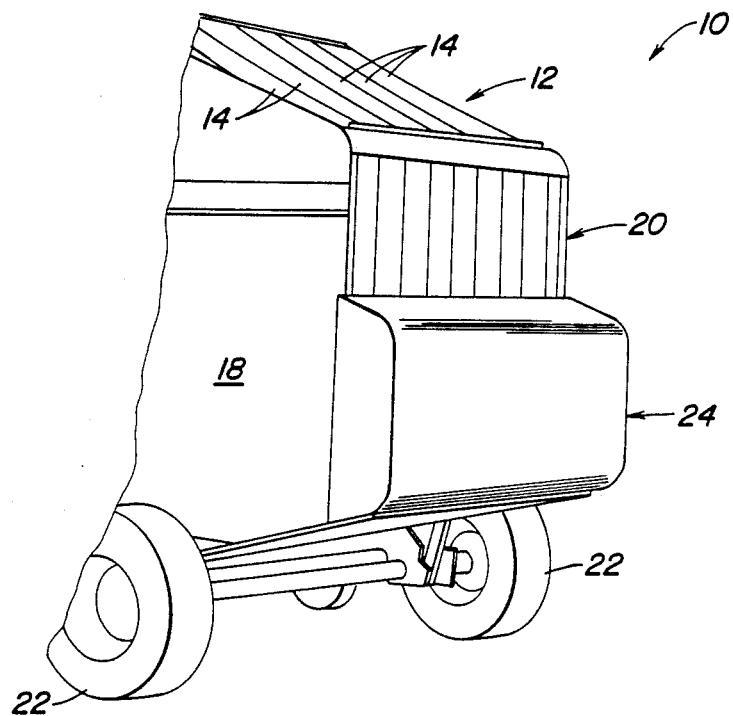
FIG. 1 is a left rear perspective view of the rear portion of a large round baler equipped with surface wrap material supply roll housing constructed in accordance with the principles of the present invention.
Figure 2:
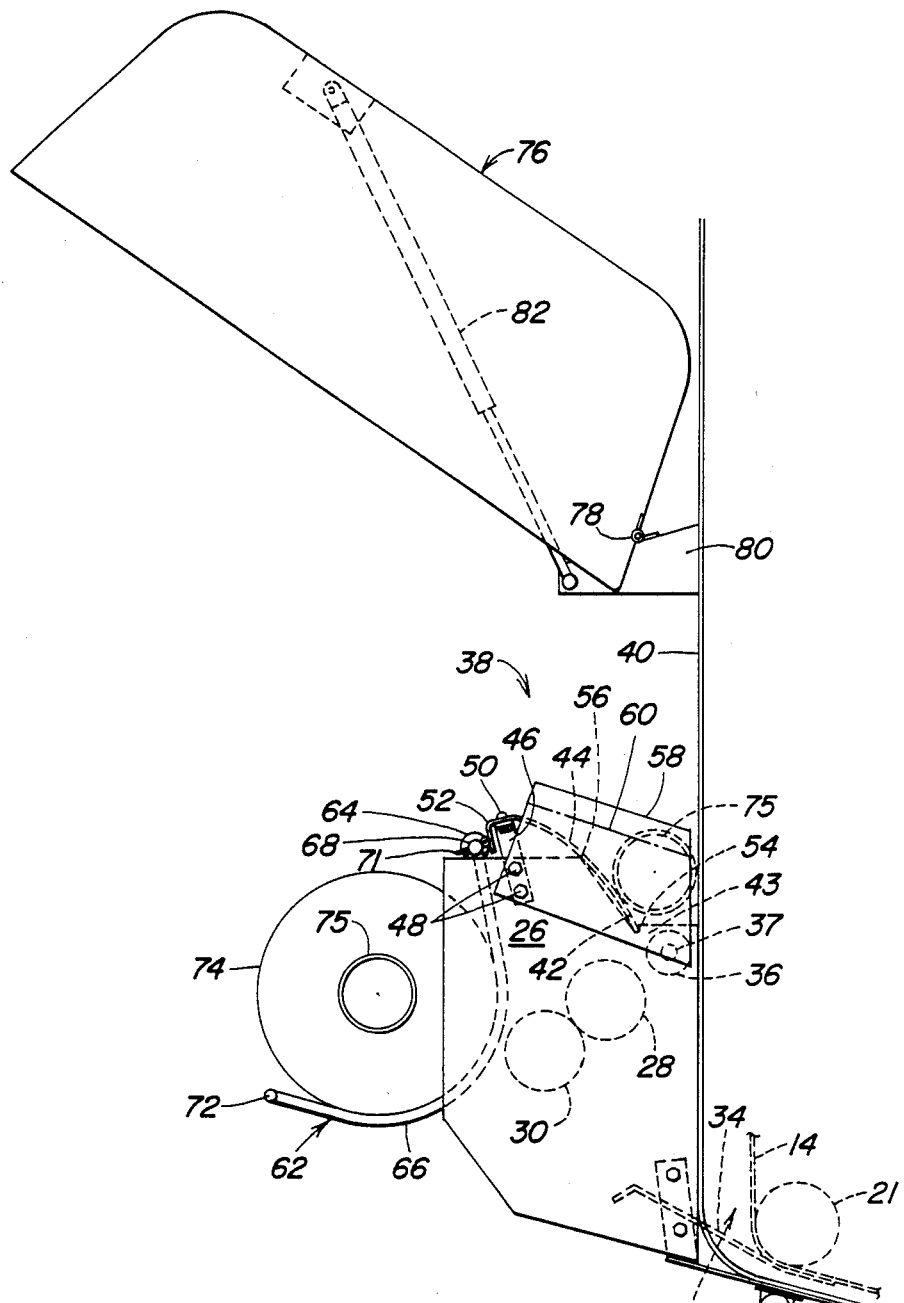
FIG. 2 is a right side elevational view of the supply roll housing showing the housing cover in an upwardly pivoted, open position, showing the supply roll loading bail or arm in a downwardly pivoted, roll loading position and showing a core of a depleted roll resting on a lower forward end portion of the curved bottom of the housing.
Figure 3:
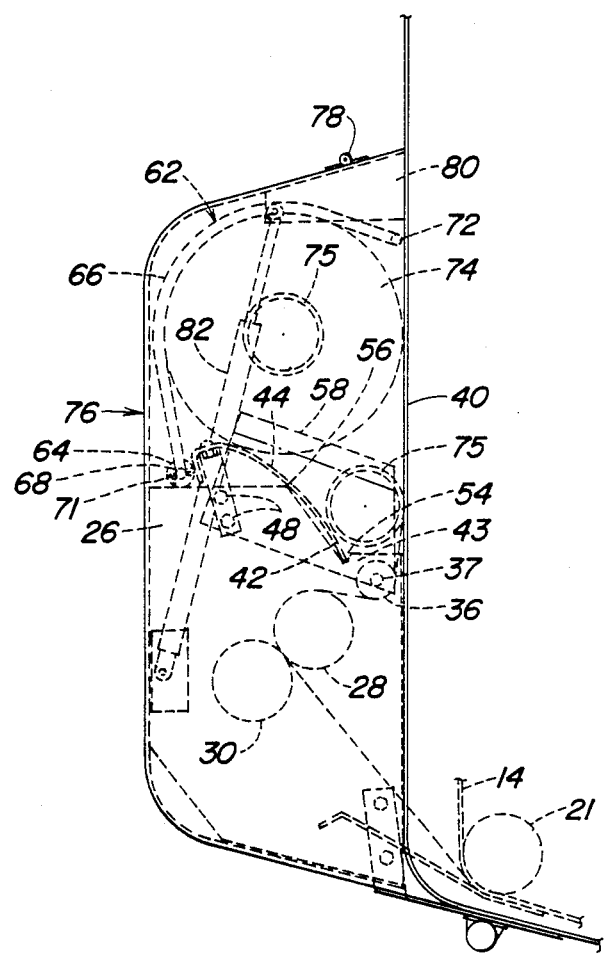
FIG. 3 is a view similar to that of FIG. 2 but showing the supply roll loading arm in an upwardly pivoted, roll deposit position and showing a full roll of wrap material that has been deposited on an upper rearward end of the curved bottom wall of the housing.

Referring now to FIG. 1, there is shown a rear portion of a large round baler 10 of a type including an expansible bale-forming chamber 12 formed in part by a plurality of side-by-side mounted, endless belts 14, in part by opposite sidewalls (not shown) of a forward portion of the baler supporting a first set of belt support rolls and in part by opposite side walls 18 of a bale discharge gate 20, these walls supporting a second set of belt support rolls including a lower rear roll 21 (FIGS. 2 and 3). A pair of ground wheels 22 support the baler for being towed over the ground by a tractor.

Referring now also to FIGS. 2 and 3, a bale wrapping mechanism 24 is shown mounted to the rear and lower portions of the discharge gate 20. The mechanism 24 includes opposite support walls 26 having forward, upright, transverse flanges bolted to similar flanges formed at the respective rear ends of the gate sidewalls 18. Extending between and having their opposite ends rotatably mounted in the support walls 26 are a pair of wrap material feed rolls 28 and 30, with the roll 28 being disposed above and forwardly of the roll 30 such that a material flight path, defined by a plane located tangentially to the rolls at their bite or nip, extends substantially into a bite or nip area 32 defined by a guide pan portion 34 and a portion of the belts 14 engaged with the lower rear support roll 21 carried by the gate 20. Located forwardly and above the upper feed roll 28 is a spreader roll 36 having its opposite ends rotatably supported by respective bearings (not shown) mounted in an upper forward location of the support walls 26 by respective bolts 37, the roll 36 carrying spiral flights (not shown) at its opposite ends with the flights being of opposite hand so as to spread wrap material engaged therewith to the full width of the spreader roll.

The bale wrap mechanism 24 includes a supply roll housing 38 having a front wall 40 defined by a vertical panel extending between and bolted to the rear ends of the gate sidewalls 18. The housing 38 further includes a downwardly and forwardly extending bottom wall 42, the bottom wall 42 and the front wall 40 converging toward a wrap material passage 43 defined between a forward edge of the wall 42 and the wall 40. The bottom wall 42 has an upper surface 44 curved convexly from front to rear with the curvature being specially selected to cooperate with the front wall so as to frictionally engage a roll of wrap material in a manner and for a purpose explained in more detail below. A pair of L-shaped straps 46 having out-turned upper ends are respectively secured to upper rear portions of the support walls 26 by a pair of spaced bolts 48. Upper rear locations of the curved housing bottom wall 42 overlie and are bolted, as at 50, to the out-turned ends of the straps 46. It is here noted that the rear end of the bottom wall 42 is bent downwardly so as to form a rounded corner 52 for engagement by a new supply roll of wrap material being loaded into the housing, in a manner described below. The wall 42 has its forward end captively engaged in respective notches or recesses 54 provided in upper forward locations of the support walls 26. A third point of support for the bottom wall 42 is provided by respective corners 56 defined at respective intermediate locations along upper edges of the walls 26. A roll of wrap material resting on the bottom wall 42 has its sideways movement limited by opposite containment plates 58, each being mounted to the support walls 26 by the pair of bolts 48 and by the bolt 37. The upper portion of each of the containment plates 58 is bent outwardly, as at 60, so that a rounded corner will be presented to the ends of the roll of wrap material being contained by the plates.

A wrap material roll loading bail or arm 62 is vertically pivotally mounted to upper rear locations of the support walls 26. Specifically, welded to respective upper edges of the walls 26 and defining a horizontal pivot axis are a pair of transversely aligned washers 64. The arm 62 is defined by a rod formed so as to define opposite legs 66 curved arcuately at a radius approximating that of a complete roll of wrap material, the legs terminating at respective out-turned ends 68 received in the washers 64 and provided with respective holes receiving containment pins 70. The ends of the legs 66 opposite the out-turned ends are joined together by a transverse section which serves as a handle 72. When the loading arm 62 is in a lowered, roll receiving position as shown in FIG. 2, the curved legs 66 will be disposed at a relatively low height for having a roll of wrap material 74, including a tubular core 75 made of cardboard or the like, placed thereon either from the ground or preferably from a truck or wagon bed or the like so as to minimize or eliminate the need for lifting the roll, it being noted that a complete roll may weigh from 75–80 pounds. Once the roll 74 is cradled by the arcuate legs 66, the roll can be deposited on the bottom wall surface 44 by lifting up on the handle 72 and pivoting the handle to its raised, roll deposit position shown in FIG. 3. It is to be noted that the arm 62 is structured about its pivot axis such that the maximum lifting force needed to lift the roll is about one-half the roll weight and, that once the arm is in its roll deposit position it will remain there due to the action of gravity. In any event, a cover 76, here shown in an upwardly pivoted open position, may be lowered about respective pivot connections 78, its upper forward corners have with angle brackets 80 bolted to the rear edges of the gate walls 18, to a closed position wherein the cover will be proximate the arm so as to prevent it from moving from its raised position. It is here noted that a pair of gas springs 82 are connected between the cover 76 and the brackets 80 such that the springs are moved over center as the cover is moved between its open and closed positions and thus act to bias the cover to its open position when it is open and to it closed position when it is closed.

The operation of the curved bottom wall 42 is now briefly stated. Assuming that a complete roll of wrap material 74 is located on the curved bottom wall surface 44, as shown in FIG. 3, a length of the material will extend downwardly from the front of the roll, pass across the front of the spreader roll 36, then rearwardly over the upper feed roll 28 and then forwardly between the feed rolls 28 and 30 where its free end is located. Assuming then that a bale has been formed in the chamber 12 and it is desired to wrap the bale, a drive means (not shown) for the feed rolls will be engaged and the rolls will act to pull wrap material from the roll and impel it towards the nip area 32 where it is grabbed by the rotating bale chamber belts 14 and carried along the guide pan 34 and other guide structure (not shown) until the wrap material enters the bale-forming chamber throat where it is directed between the belts and the formed bale so as to be grabbed and pulled by the action of the rotating bale and belts. When the desired amount of wrap has been applied to the circumference of the bale, a cut-off knife (not shown) is actuated to cause the knife blade to impact the wrap material in that segment stretched between the feed rolls 28–30 and the nip area 32. Once the material is cut, the belts 14 will continue to be driven only long enough for the last portion of the material to be pulled into the bale-forming chamber. The belt drive is then discontinued and the discharge gate opened to deposit the wrapped bale on the ground, all in a manner well known in the art.

During the above-described wrapping cycle, the roll of wrap material will have been prevented from rotating freely due to the braking force imposed on the periphery thereof due to its frictional engagement with the bottom wall 42 and the front wall 40, it being noted that the surface 44 of the wall 42 is curved and oriented such that the weight of the roll 74 tends to wedge it between the walls 40 and 42. Furthermore, the shape and orientation of the wall 42 relative to the wall 40 is such, that as the wrap material is used up and the weight and diameter of the roll decreases, the amount of wedging action increases so that the braking force due to the frictional resistance of the roll to rotation remains substantially constant to the point where nothing but the tubular roll core 75 remains, as shown in FIGS. 2 and 3 of the drawings.

What is claimed is:

1. In a large round baler including support structure adjacent a bale-forming chamber, a bale wrapping mechanism mounted to the support structure and including a wrap material supply roll housing adapted for holding a supply roll from which wrap material is pulled during wrapping a bale located in the chamber, the improvement comprising: said housing including a generally upright first wall extending transversely across the bale-forming chamber; a bottom wall sloped upwardly away rom the first wall and being spaced therefrom so as to define a wrap material passage between the first and bottom walls; and said bottom wall including an upper surface means shaped for causing the frictional resistance, hence the braking force imposed on the periphery of the roll in opposition to its being rolled, in response to wrap being pulled therefrom during the wrapping of a series of bales, to remain substantially constant as the roll decreases in weight and diameter.

2. A large round baler as defined in claim 1 wherein said upper surface means is convex as considered in a longitudinal direction.

3. A large round baler as defined in claim 1 wherein an end of the bottom wall that is remote from the first wall is rounded to prevent a roll of wrap material from being damaged during loading of the roll onto the bottom wall.

4. A large round baler as defined in claim 1 wherein said bale-forming chamber includes a pair of transversely spaced side walls; said support structure includes a pair of transversely spaced support walls respectively fixed to and forming continuations of the pair of side walls; a pair of upright, L-shaped straps being respectively fixed to and projecting upwardly from the pair of support walls at respective locations spaced from said first wall, the pair of straps each having an out-turned upper end; said pair of support walls each having a notch formed in an upper edge portion thereof spaced toward the first wall and downwardly from said straps; and said bottom wall having an end portion remote from said first wall supported by and fixed to said pair of straps and having an edge adjacent the first wall received in the notch of each support wall.

5. A large round baler as defined in claim 4 wherein a pair of roll containment plates are respectively mounted to and project upwardly from the pair of support walls; and each containment plate has an upper, upwardly and outwardly bent marginal portion located above the bottom wall and sloped upwardly away from said first wall whereby the containment plates limit sideways movement of a roll of wrap material resting on the bottom wall.

6. A large round baler as defined in claim 5 and further including a spreader roll extending between and having its opposite ends supported respectively from the pair of support walls by a pair of roll support bolts located below the wrap material passage; said pair of straps each being fixed to a respective one of the pair of support walls by a pair of strap support bolts; and said pair of containment plates each respectively being connected to the pair of support walls by a respective pair of the strap support bolts and by a respective one of the roll support bolts.

7. In a large round baler including a bale discharge gate having a pair of transversely spaced sidewalls and a wrapping mechanism including a pair of support walls respectively connected to lower rear portions of the pair of side walls, said mechanism including an improved wrap material supply roll housing, comprising: an upright front wall extending between and being fixed to said sidewalls; a bottom wall means extending transversely behind and being sloped upwardly and rearwardly relative to the front wall and including a transverse forward end spaced rearwardly of said front wall and cooperating with the latter to define a wrap material passage therebetween; and said bottom wall means cooperating with said front wall to define brake means for resisting the unwrapping of wrap material from a wrap material supply roll resting on the bottom wall means by a substantially constant force throughout the usage of the roll as the latter decreases in weight and diameter.

8. A large round baler as defined in claim 7 wherein said bottom wall means is in the form of a plate shaped so as to have an upwardly curved upper surface extending from front to rear of the plate.

9. A large round baler as defined in claim 8 wherein the rear of the plate is bent downwardly so as to form a rounded surface for keeping the bottom wall means from damaging a roll of wrap material during loading the roll onto the bottom wall means.

* * * * *